United States Patent
Siddiqui et al.

(10) Patent No.: US 9,442,518 B2
(45) Date of Patent: Sep. 13, 2016

(54) MOUNTING WEDGE FOR FLEXIBLE MATERIAL

(71) Applicant: Microsoft Technology Licensing, LLC, Redmond, WA (US)

(72) Inventors: Kabir Siddiqui, Sammamish, WA (US); Stephan Alexander Cummings, Wilsonville, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 14/336,545

(22) Filed: Jul. 21, 2014

(65) Prior Publication Data

US 2015/0346771 A1 Dec. 3, 2015

Related U.S. Application Data

(60) Provisional application No. 62/006,568, filed on Jun. 2, 2014.

(51) Int. Cl.
*G06F 1/16* (2006.01)
*F16B 11/00* (2006.01)

(52) U.S. Cl.
CPC ........... *G06F 1/1626* (2013.01); *F16B 11/002* (2013.01); *G06F 1/163* (2013.01); *G06F 1/1637* (2013.01); *G06F 1/1656* (2013.01); *Y10T 403/76* (2015.01)

(58) Field of Classification Search
CPC ..................................................... G06F 1/16
See application file for complete search history.

(56) References Cited

U.S. PATENT DOCUMENTS

| | | | | |
|---|---|---|---|---|
| 5,295,089 | A | * 3/1994 | Ambasz | G06F 1/1628 348/791 |
| 5,588,858 | A | 12/1996 | Lester | |
| 8,152,749 | B2 | 4/2012 | Ponsi et al. | |
| 8,199,488 | B2 | * 6/2012 | Zou | B32B 3/02 312/223.1 |
| 8,773,847 | B2 | * 7/2014 | Byun | H04B 1/385 361/679.03 |

FOREIGN PATENT DOCUMENTS

GB 2347733 9/2000

OTHER PUBLICATIONS

"Attaching Metal Grilles and Screens to Plastic Frames", Retrieved from: <http://www.thermalpress.com/attaching-metal-grilles-and-screens-to.asp> May 5, 2014, 2013, 2 Pages.
"Commercial Hot Wedge Sealing Services", Retrieved from: <http://www.thomasnet.com/ccpcontent.html?ccpid=172862> May 5, 2014, Oct. 15, 2013, 1 Page.
"Heat Sealing Coated/Laminated Fabric Seams", Retrieved From: <http://www.seamtek.com/heat-sealing.html> May 5, 2014, Jan. 5, 2013, 3 Pages.

(Continued)

*Primary Examiner* — Lisa Lea Edmonds
(74) *Attorney, Agent, or Firm* — Qudus Olaniran; Judy Yee; Micky Minhas

(57) ABSTRACT

Implementations of a mounting wedge for a flexible material are described. According to various embodiments, a flexible material such as a fabric is laminated to a surface of a device, such as a portable computing device. At least some embodiments utilize a mounting wedge to secure an edge of the flexible material to the device, as well as for a mounting surface for a component of the device.

20 Claims, 12 Drawing Sheets

(56) References Cited

OTHER PUBLICATIONS

"Heat Staking and Thermal Riveting Technology Overview", Retrieved From: <http://www.bartec-dt.com/technology-overview-heat-staking.php> May 5, 2014, Sep. 18, 2012, 3 Pages.

"Hot Wedge Welder—WEDGE—IT", Retrieved From: <http://www.sibastech.com/main/page_products_hot_wedge_welder.html> May 5, 2014, 2 Pages.

"Hot Wedge Welding", Retrieved From: <http://www.weldmaster.com/hot-wedge-welding> May 5, 2014, 4 Pages.

"International Search Report and Written Opinion", Application No. PCT/US2015/033535, Sep. 2, 2015, 15 Pages.

"Second Written Opinion", Application No. PCT/US2015/033535, Mar. 9, 2016, 8 pages.

"International Preliminary Report on Patentability", Application No. PCT/US2015/033535, May 27, 2016, 9 pages.

* cited by examiner

MOUNTING WEDGE FOR FLEXIBLE MATERIAL

RELATED APPLICATION

This application claims priority under 35 U.S.C. §119(e) to U.S. Provisional Patent Application No. 62/006,568, entitled "Mounting Wedge for Flexible Material" and filed on Jun. 2, 2014, the disclosure of which is incorporated in its entirety by reference herein.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Implementations of a mounting wedge for a flexible material are described. According to various embodiments, a flexible material such as a fabric is laminated to a surface of a device, such as a portable computing device. At least some embodiments utilize a mounting wedge to secure an edge of the flexible material to the device, as well as for a mounting surface for a component of the device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Implementations of a mounting wedge for a flexible material are described. According to various implementations, a flexible material such as a fabric is laminated to a surface of a device, such as a portable computing device. A mounting wedge is employed to secure an edge of the flexible material to the device, as well as a mounting surface for a component of the device. The mounting wedge, for instance, can be employed for attachment of a display surface (e.g., a display screen) to the device. In at least some implementations, the mounting wedge aids in prevention of peeling and delamination of a flexible material from a device chassis, and provides an attachment surface for device components.

Generally, lamination of fabric to a device can enhance a user experience in a variety of ways. For instance, consider a device that may be used in handheld scenarios, such as a tablet computer, and smartphone, and so forth. Typically, a chassis of such as device is fabricated from a rigid material, such as metal, metal alloys, plastic, and so forth. Laminating the chassis with fabric enables a more comfortable handheld user experience than a metallic or plastic material. Further, fabric may be less slippery and thus may reduce the likelihood that a device will slip from a user's hand and be dropped. Fabric lamination may also provide damage protection to a device, such as by reducing scratching and/or denting of an underlying surface.

Fabric lamination may also dampen vibration of device components. For instance, fabric may absorb and/or disperse vibrations, such as during movement of a moveable component. This can reduce noise caused by vibrations that may occur during movement of a moveable component. This may also decrease user annoyance and discomfort that may result from physically perceptible vibrations.

In the following discussion, an example device is first described that may employ the techniques described herein. Implementations discussed herein, however, are not limited to the example device. Next, a section titled "Mounting Wedge" describes some example implementations of a mounting wedge in accordance with one or more implementations. Following this, a section titled "Mounting Wedge Scenarios" describes example implementation scenarios for utilizing a mounting wedge in accordance with one or more implementations. Next, a section titled "Example Procedure" describes an example fabrication method utilizing a mounting wedge in accordance with one or more implementations. Finally, an example system and device are discussed that may implement various techniques described herein.

Example Device

Figure 1:
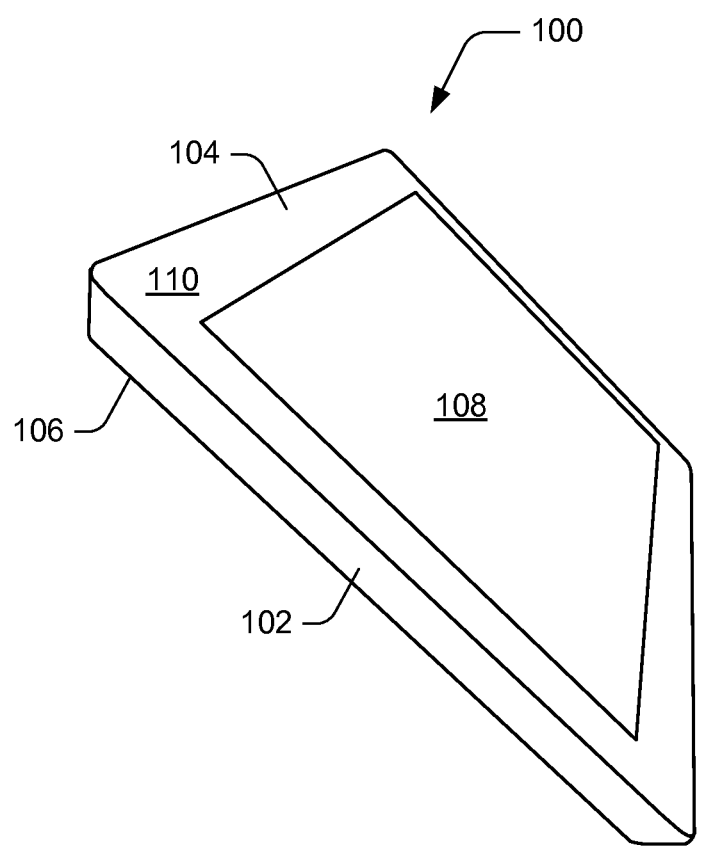
FIG. 1 is an illustration of an example computing device that is operable to employ techniques described herein in accordance with one or more embodiments.

FIG. 1 is an illustration of a computing device 100 which may be configured according to techniques for mounting wedge for flexible material discussed herein. In this particular example, the computing device 100 is configured as a tablet computing device. This is not intended to be limiting, however, and the computing device 100 may be configured in a variety of other ways, such as a mobile phone, a wearable device, a desktop computing device, a gaming apparatus, and so on.

Thus, the computing device 100 may range from full resource devices with substantial memory and processor resources to a low-resource device with limited memory and/or processing resources. The computing device 100 is operably associated with software that causes the computing device 100 to perform one or more operations. An example implementation of the computing device 100 is discussed below with reference to FIG. 15. Please note that the computing device 100 and its various components illustrated in the accompanying figures are not necessarily illustrated to scale.

The computing device 100 includes a chassis 102 with a front surface 104 and a rear surface 106. Generally, the chassis 102 is representative of a main supporting structure of the computing device 100. The chassis 102 may be constructed from various types and/or combinations of materials, such as plastics, metals, alloys, fiber composites, and so forth. Various components of the computing device 100 may be attached to the chassis 102, such as to internal and/or external surfaces of the chassis 102.

Disposed on the front surface 104 is a display surface 108, which is representative of a surface covering a display device of the computing device 100. According to various implementations, the display surface 108 may be integrated into a display device, or may be a covering over a display device that is mounted within the chassis 102 beneath the display surface 108. The display surface 108 may be formed from any suitable material, such as glass, plastic, and so forth. The front surface 104 further includes a bezel 110 that represents a perimeter portion of the front surface 104 that surrounds the display surface 108.

According to various implementations, portions of the outer surface of the computing device 100 are covered in fabric. For instance, the bezel 110 and/or the rear surface 106 are laminated with fabric. In at least some implementations, all external surfaces of the computing device 100 with the exception of the display surface 108 and any openings for cable and/or peripheral attachment may be covered in fabric. Generally, a fabric is representative of a flexible material that may be laminated to outer surfaces of the computing device 100. Examples of a suitable fabric include fabrics made from natural materials (e.g., cotton, silk, wool, linen, and so forth), fabrics made from synthetic materials (e.g., nylon, polyester, aramid, carbon fiber, and so forth), and combinations thereof. As used herein, however, "fabric" may refer to any flexible material, and may include flexible metals (e.g., thin sheet metals), metallic materials, rubber (e.g., natural and/or synthetic), and so forth. These examples are not to be construed as limiting, and a variety of other types and instances of flexible materials may be employed in accordance with the claimed implementations.

According to one or more implementations, lamination of a fabric layer to an underlying surface may include adhering the entire fabric layer to an underlying surface. Alternatively, a fabric layer may be laminated by partially adhering the fabric layer to an underlying surface. For instance, some portions of a fabric layer can be adhered to a surface (e.g., using an adhesive and/or other attachment technique) while other portions may not be adhered. The other portions, for example, may be laid and/or stretched over portions of an underlying surface, such as over portions between adhered portions of the fabric layer.

While not expressly illustrated herein, the computing device 100 may be configured to enable removable attachment of various peripheral devices to the computing device 100. Examples of such peripheral devices include input devices, such as a keyboard, a game controller, a music input device (e.g., a digital piano keyboard), and so forth. Removable attachment may be accomplished in a variety of ways, such as via magnetic attachment, connector attachment, clip attachment, and so forth.

Figure 2:
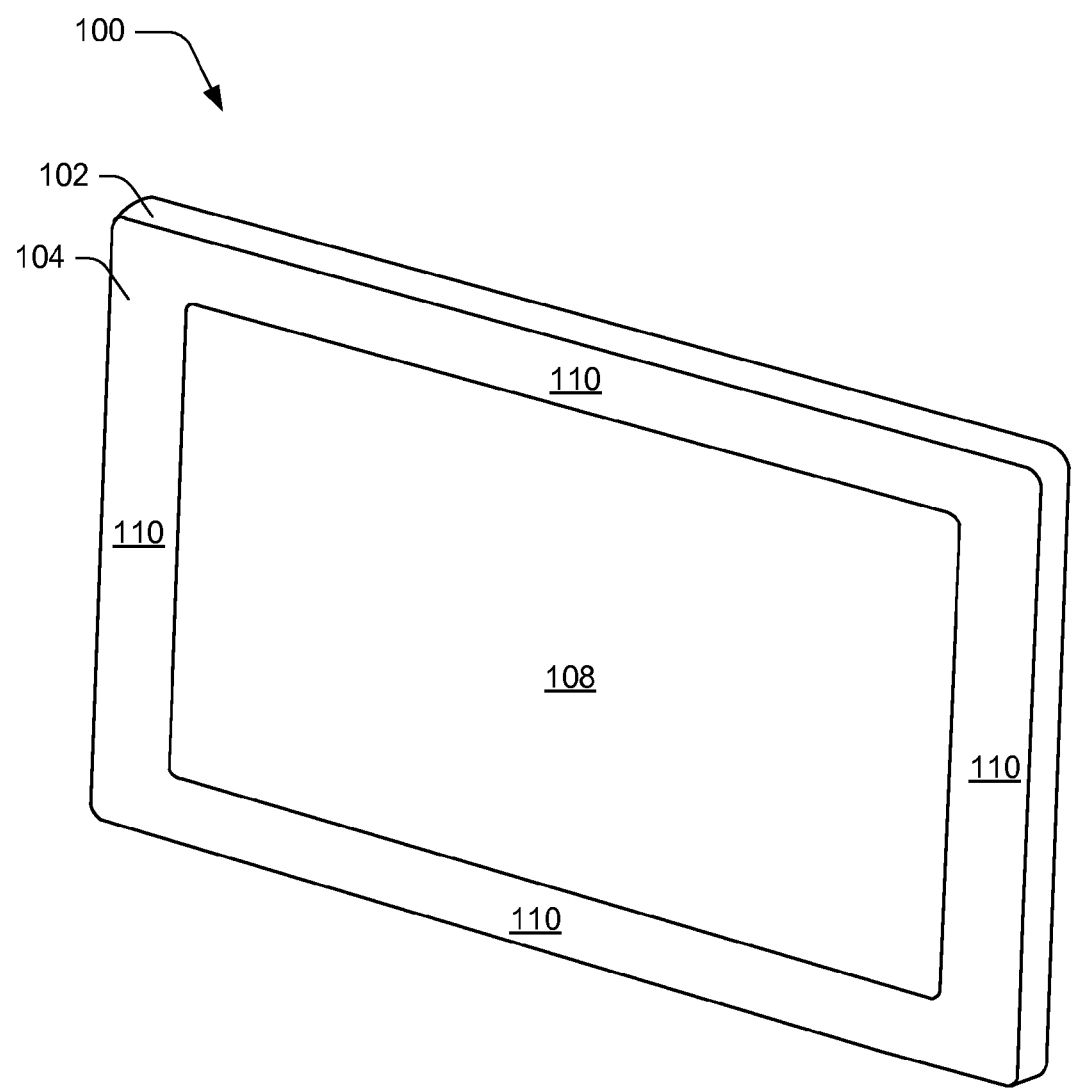
FIG. 2 illustrates a computing device from a different viewing angle than that presented in FIG. 1 in accordance with one or more embodiments.

FIG. 2 illustrates the computing device 100 from a different viewing angle than that presented in FIG. 1. In this viewing angle, the physical arrangement of the bezel 110 with respect to the front surface 104 and the display surface 108 is more easily seen. As noted above, the bezel 110 is laminated in fabric. As further detailed below, a mounting wedge is fastened within the chassis 102 beneath the display surface 108. Generally, the mounting wedge provides a way for securing an edge of the bezel fabric along the periphery of the display surface 108, as well as providing a mounting platform for securing the display surface 108.

Have introduced the computing device 100, consider now a discussion of some example implementations of a mounting wedge in accordance with one or more implementations.

Mounting Wedge

Figure 3:
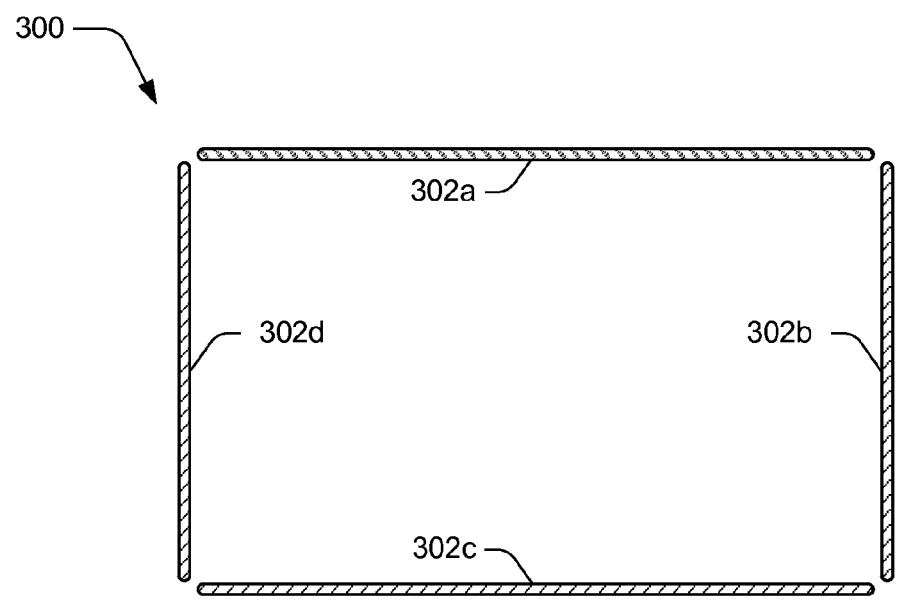
FIG. 3 illustrates a mounting wedge structure in accordance with one or more embodiments.

FIG. 3 illustrates a mounting wedge structure 300 in accordance with one or more implementations. The mounting wedge structure 300 includes mounting wedges 302a, 302b, 302c, and 302d. The mounting wedges 302a-302d can be formed from any suitable material, such as plastic, metal, composite materials, alloys, and so forth. As further detailed herein, the mounting wedge structure 300 provides a structure for securing a fabric edge and for mounting different components to a device.

Figure 4:
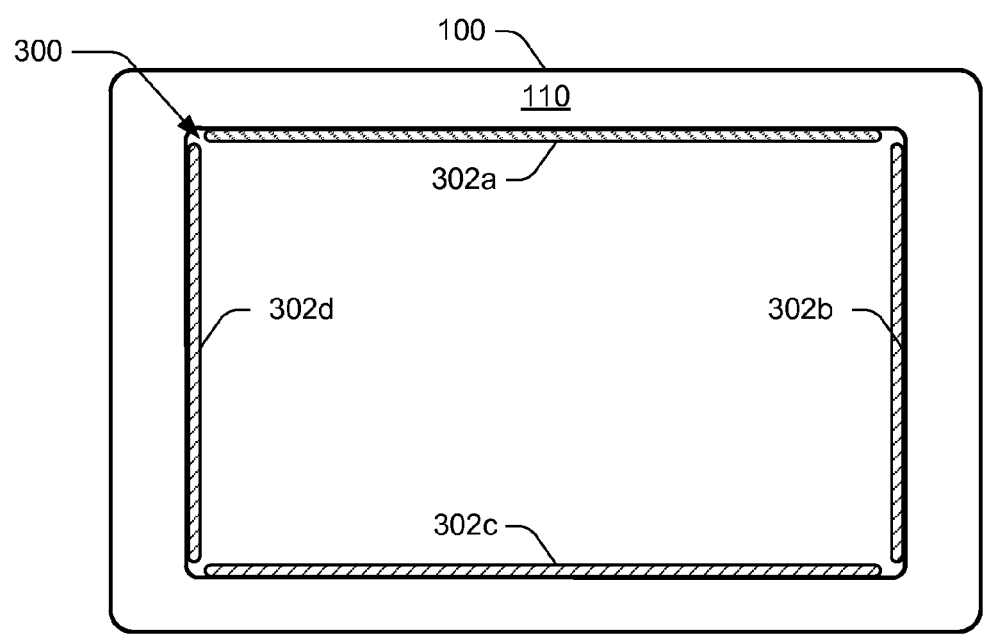
FIG. 4 illustrates a front view of a computing device with a mounting wedge structure in accordance with one or more embodiments.

FIG. 4 illustrates a front view of the computing device 100 without the display surface 108, e.g., prior to installation of the display surface 108. Installed along the inside edge of the bezel 110 is the mounting wedge structure 300 including the mounting wedges 302a-302d. As further illustrated in subsequent figures, the top surfaces of the mounting wedges 302a-302d are flat and provide a mounting surface for the edges of the display surface 108 and/or other components. Example ways of installing the mounting wedges 302a-302d are discussed below.

According to various implementations, using the separate mounting wedges 302a-302d provides a way of accounting for variations in chassis size for the computing device 100. For instance, during a manufacturing process, variations in size may occur between different chassis for different instances of the computing device 100. Thus, utilizing the separate mounting wedges with gaps in between enables the mounting wedge structure 300 to be installed in devices that may vary slightly in size. This is not intended to be limiting, however, and some alternative implementations may utilize a single piece mounting wedge structure while remaining within the scope of the claimed implementations.

Figure 5:
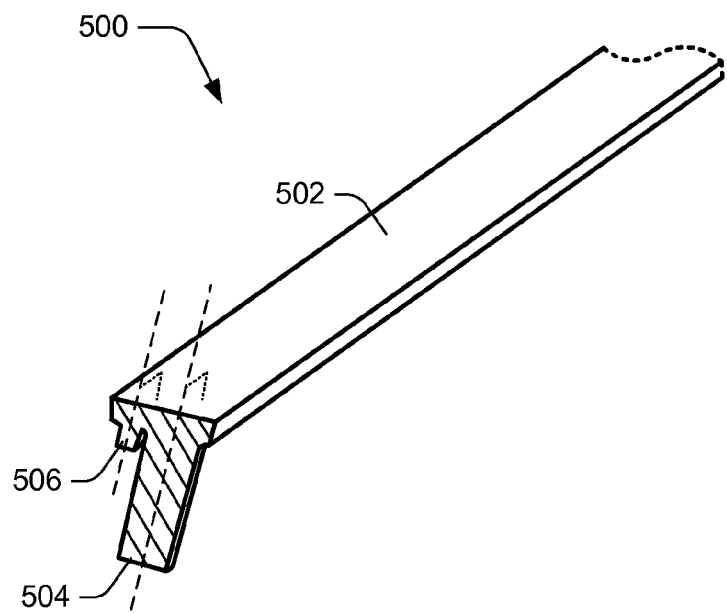
FIG. 5 illustrates a cross section of a mounting wedge in accordance with one or more embodiments.

FIG. 5 illustrates a cross section of a portion of an example mounting wedge 500. The mounting wedge 500 includes a top surface 502 on which various components may be mounted, such as the display surface 108. The mounting wedge 500 also includes a mounting pin 504, which is representative of a portion of the mounting wedge 500 that can be used to attach the mounting wedge 500 to an associated device. In at least some implementations, the mounting pin 504 can be implemented as a staking pin that can be used to attach the mounting wedge 500 to an associated device using any suitable staking technique, such as heat staking, mechanical staking, and so forth. This is not intended to be limiting, however, and the mounting wedge 500 may be attached to a device using any suitable attachment technique in addition or in alternative to staking Notice that in that particular example, an axis through the length of the mounting pin 505 is perpendicular to the plane of the top surface 502.

The mounting wedge 500 further includes a wedge rib 506 that runs along a bottom surface of the mounting wedge 500 and that enables the mounting wedge 500 to apply pressure to a fabric edge to secure the fabric in place. In at least some implementations, the wedge rib 506 may be implemented as a single continuous rib disposed on the bottom surface of the mounting wedge, or may be implemented as multiple discrete ribs that are intermittently disposed on the bottom surface of the mounting wedge 500. Notice that in this particular example, an axis through the length of the wedge rib 506 is perpendicular to the plane of the top surface 502.

While the mounting wedge 500 is illustrated as being rectangular, this is not intended to be limiting. For instance, a mounting wedge can be implemented in a variety of different shapes and configurations within the spirit and scope of the claimed implementations. A mounting wedge, for example, may be circular, oval, arc-shaped, and so forth. Thus, a mounting wedge and/or mounting wedge structure may be formed in a variety of different shapes to suit a variety of different implementation scenarios.

Figure 6:
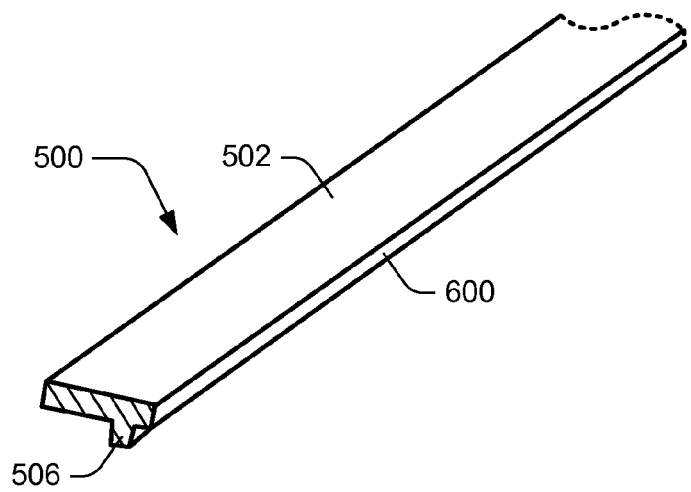
FIG. 6 illustrates a cross section of a mounting wedge in accordance with one or more embodiments.

FIG. 6 illustrates another cross section of a different portion of the mounting wedge 500. The view illustrated in FIG. 6 is rotated in comparison to the view presented in FIG. 5. In addition to the top surface 502 and the wedge rib 506, the mounting wedge 500 includes a front edge 600. Generally, the front edge 600 represents a front surface of the mounting wedge 500 that faces the bezel 110 and that is used to apply pressure to an edge of a portion of fabric that is laminated to the bezel 110 of the computing device 100.

Figure 7:
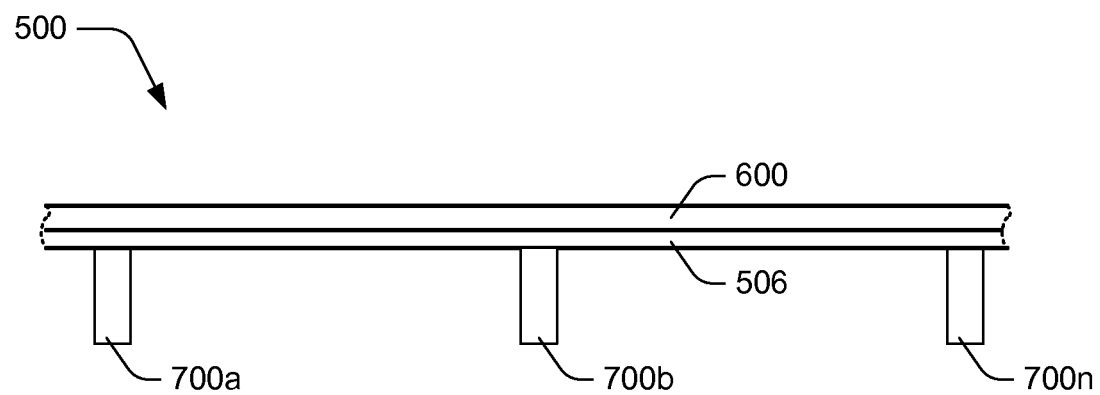
FIG. 7 illustrates a front view of a mounting wedge including multiple mounting pins in accordance with one or more embodiments.

FIG. 7 illustrates a front view of a portion of the mounting wedge 500, including the front edge 600 and the wedge rib 506 disposed beneath the front edge 600. Further included are mounting pins 700a, 700b, and 700n disposed along the lower surface of the mounting wedge 500. According to one or more implementations, the mounting pins 700a-700n represent implementations of the mounting pin 504, introduced above. As illustrated, the mounting pins 700a-700n are disposed intermittently along the lower surface of the mounting wedge 500. According to various implementations, any number and/or configuration of mounting pins may be utilized, such as to suit different implementation scenarios for the mounting wedge 500.

Mounting Wedge Scenarios

This section discusses some example scenarios for utilizing a mounting wedge in different scenarios in accordance with one or more implementations.

Figure 8:
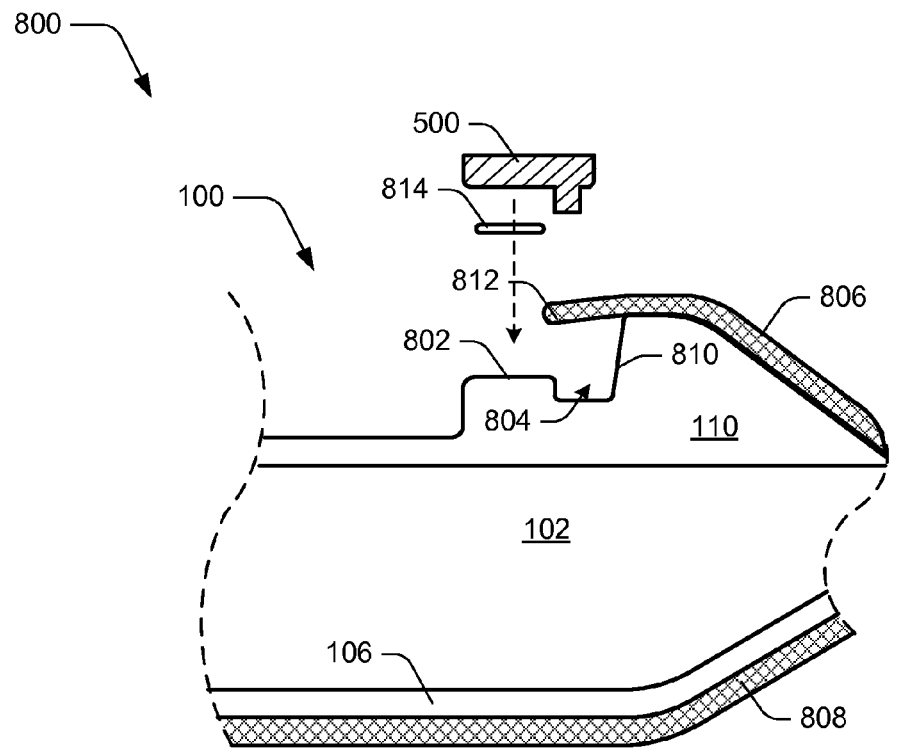
FIG. 8 illustrates an example implementation scenario for mounting wedge attachment in accordance with one or more embodiments.
Figure 8:
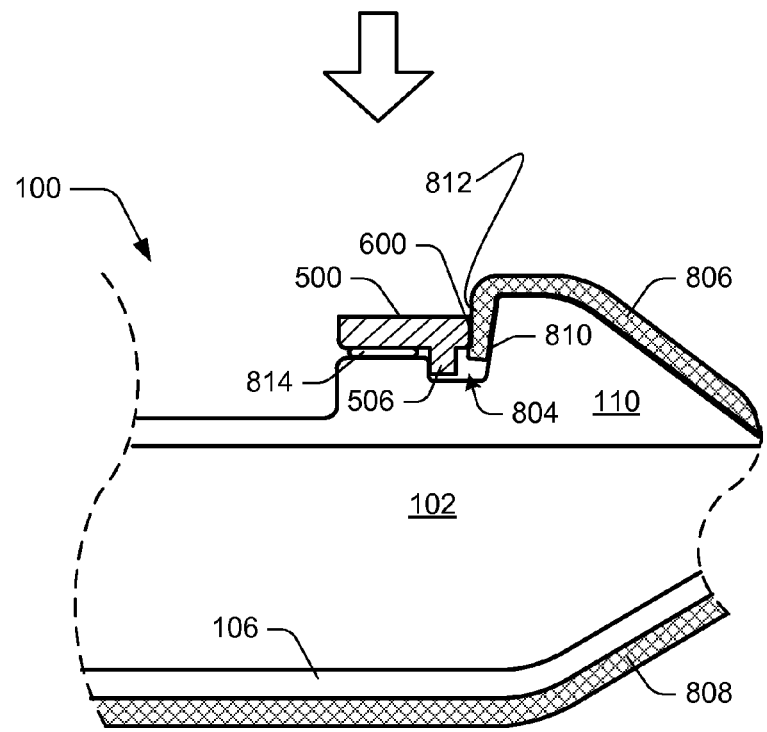

FIG. 8 illustrates an example implementation scenario 800 for mounting wedge attachment in accordance with one or more implementations. The upper portion of the scenario 800 includes a side cutaway view of portions of the computing device 100 introduced above, including a portion the chassis 102, the rear surface 106, and the bezel 110. Further illustrated as part of the chassis 102 are an attachment surface 802 and a wedge channel 804.

The computing device 100 includes an upper fabric layer 806 which is laminated to the outer surface of the bezel 110, and a lower fabric layer 808 which is laminated to the rear surface 106. Generally, the view presented in the upper portion of the scenario 800 represents a particular stage in a manufacturing process for the computing device 100 in which various surfaces of the computing device 100 are laminated with fabric. Notice that the upper fabric layer 806 overlaps an inner edge 810 of the bezel 110 such that an inner fabric edge 812 protrudes past the inner edge 810. For instance, the upper fabric layer 806 is larger (e.g., has a larger surface area) than the outer surface of the bezel 110.

Continuing with the scenario 800, the mounting wedge 500 is attached to the chassis 102 adjacent to the inner edge 810 of the bezel. As illustrated, the mounting wedge 500 is attached to the attachment surface 802 via an adhesive 814 and/or other attachment method. Additionally or alternatively, the mounting pin 504 (introduced above) may be used to mount the mounting wedge 500 to the chassis 102, in addition or alternatively to the adhesive 814. Any suitable adhesive 814 may be utilized, such as a pressure sensitive adhesive (PSA), a contact adhesive, a multi-part adhesive, and so forth.

Proceeding to the lower portion of the scenario 800, attachment of the mounting wedge 500 to the chassis 102 causes the inner fabric edge 812 to be pinched between the front edge 600 of the mounting wedge 500 and the inner edge 810 of the bezel 110. An optional adhesive layer may also be used to aid in holding the inner fabric edge 812 against the inner edge 810.

To enable persistent pressure to be applied against the inner fabric edge 812 by the front edge 600 of the bezel, the wedge rib 506 is pressed into and interlocks with the wedge channel 804. Generally, the wedge channel 804 is formed along some or all of the inner edge 810 of the bezel 110. The width of the wedge channel 804 is such that when the mounting wedge 500 is installed, a gap between the front edge 600 of the mounting wedge 500 and the inner edge 810 of the bezel 110 is smaller than a thickness of the inner fabric edge 812 in a relaxed state, e.g., prior to installation of the mounting wedge 500. Thus, the mounting wedge 500 holds the inner fabric edge 812 against the inner edge 810 of the bezel 110 and aids in preventing peeling and/or delamination of the fabric layer 806.

Figure 9:
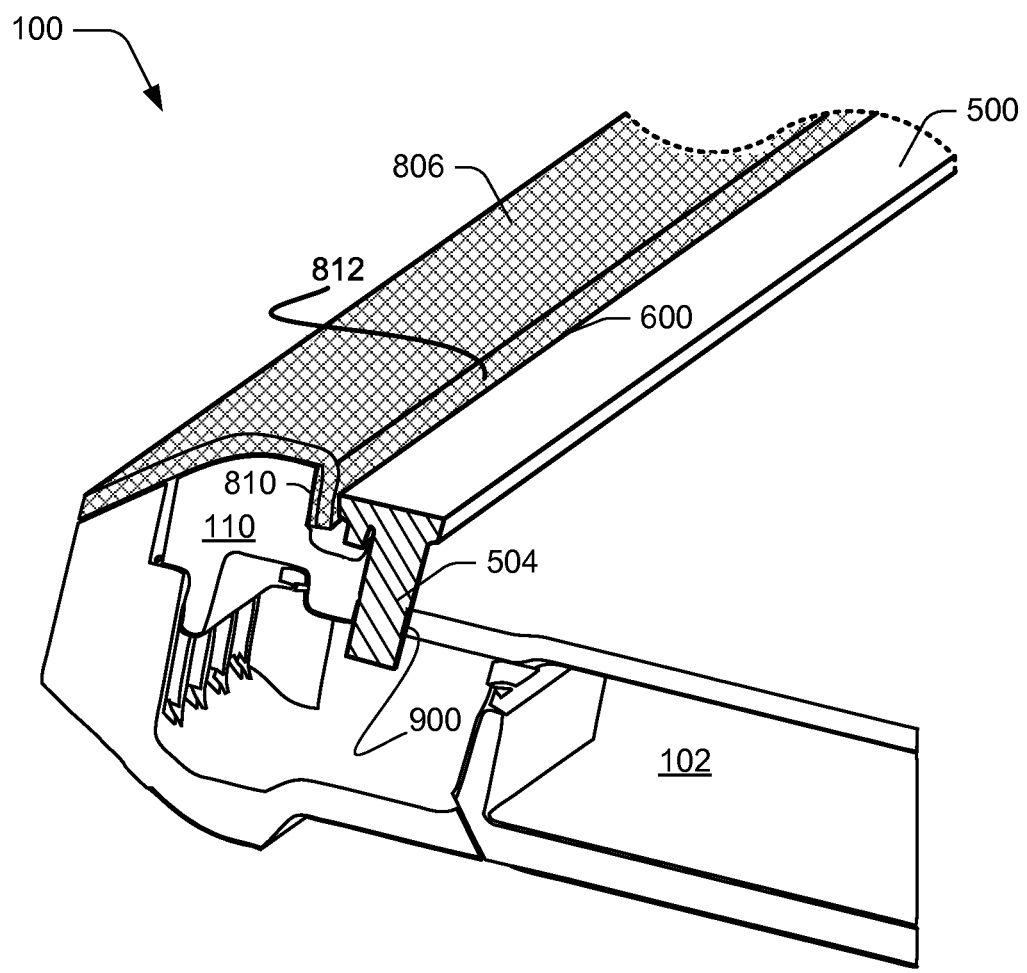
FIG. 9 illustrates a side cutaway view of portions of a computing device after installation of a mounting wedge in accordance with one or more embodiments.

FIG. 9 illustrates a side cutaway view of portions of the computing device 100 after installation of the mounting wedge 500, such as discussed above with reference to FIG. 8. For ease of understanding, certain features of the computing device 100 are omitted.

Illustrated here is the inner fabric edge 812 of the upper fabric layer 806 pinched between the front edge 600 of the mounting wedge 500 and the inner edge 810 of the bezel 110. Further illustrated is the mounting pin 504 fastened within a fastening hole 900 of the chassis 102. The fastening hole 900, for instance, occurs within the attachment surface 802 discussed above with reference to FIG. 8. In at least some implementations, the mounting pin 504 represents a staking pin that can be fastened within the fastening hole 900 via a staking technique such as mechanic staking, heat staking, and so forth. Thus, securing the mounting pin 504 within the fastening hole 900 provides a way of attaching the mounting wedge 500 to the chassis 102 that minimizes variations in the surface plane of the top surface 502. As discussed above with reference to FIG. 7, the mounting wedge 500 may employ multiple mounting pins at various places along its surface to enable attachment of the mounting wedge 500 to an adjacent surface.

Figure 10:
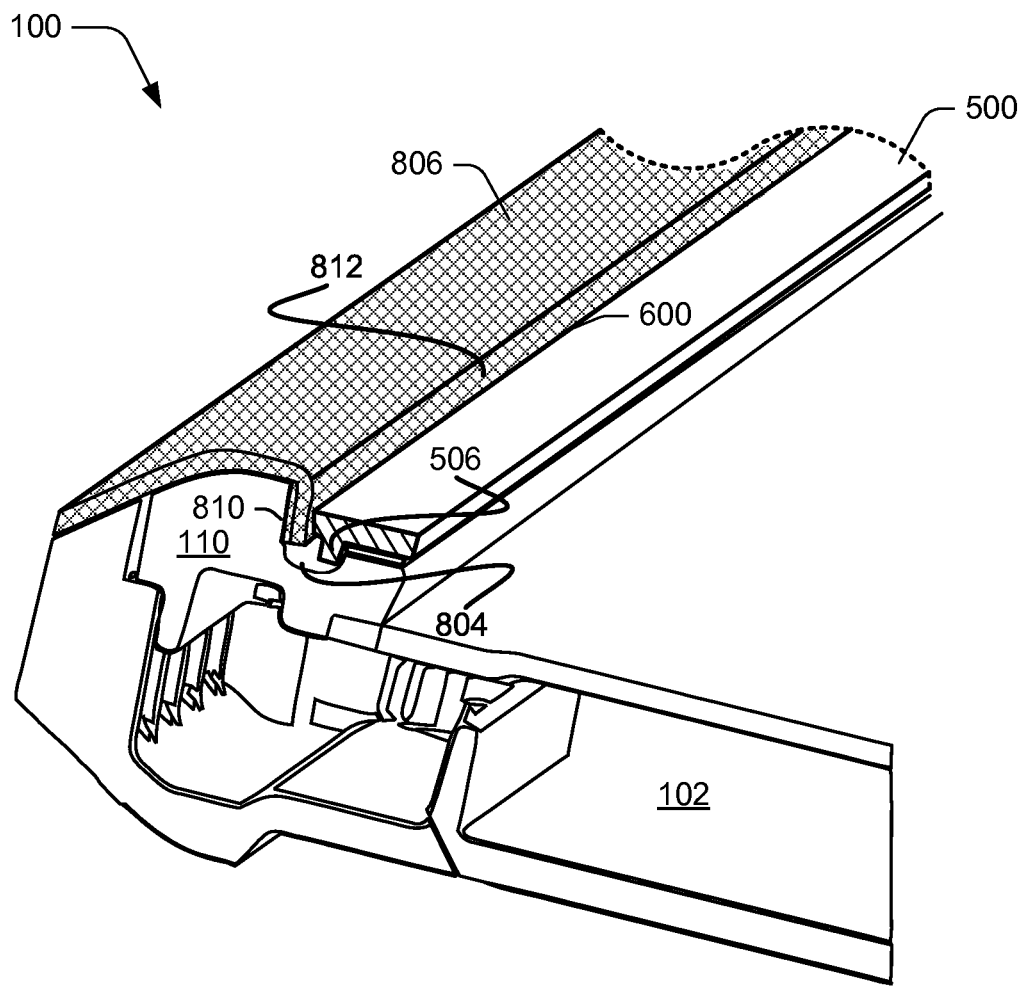
FIG. 10 illustrates a side cutaway view of portions of a computing device after installation of a mounting wedge in accordance with one or more implementations.

FIG. 10 illustrates a side cutaway view of portions of the computing device 100 after installation of the mounting wedge 500, such as discussed above with reference to FIG. 8. For ease of understanding, certain features of the computing device 100 are omitted. FIG. 10 illustrates a cross-section of a different portion of the mounting wedge 500 than that illustrated in FIG. 9.

Illustrated as part of FIG. 10 is the inner fabric edge 812 of the upper fabric layer 806 pinched between the front edge 600 of the mounting wedge 500 and the inner edge 810 of the bezel 110. Further illustrated is the wedge rib 506 interlocked within the wedge channel 804. As referenced above, during attachment of the mounting wedge 500 to the chassis 102, the wedge rib 506 is pressed into the wedge channel 804. This causes the front edge 600 of the mounting wedge 500 to apply pressure against the inner fabric edge 812. The pressure against the inner fabric edge 812 aids in holding the inner fabric edge 812 in place, thus preventing movement of the upper fabric layer 806 that may cause peeling and/or delamination of the upper fabric layer 806.

Figure 11:
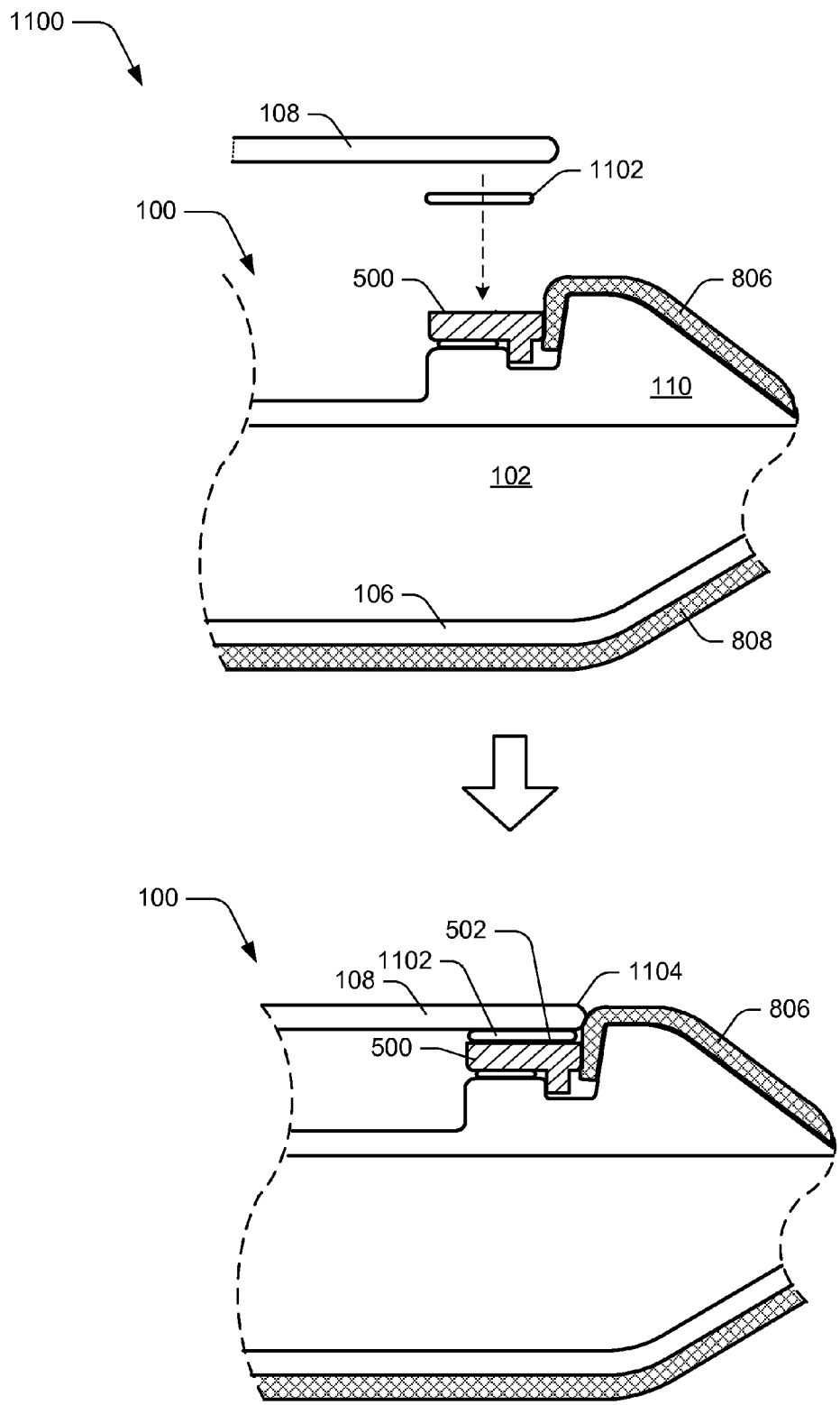
FIG. 11 illustrates an example implementation scenario for attaching a component to a mounting wedge in accordance with one or more implementations.

FIG. 11 illustrates an example implementation scenario 1100 for attaching a component to a mounting wedge in accordance with one or more embodiments. In at least some implementations, the scenario 1100 represents a continuation of the scenario 800 discussed above. The upper portion of the scenario 1100 includes a side cutaway view of portions of the computing device 100 introduced above, including a portion the chassis 102, the rear surface 106, and the bezel 110. Further illustrated are the upper fabric layer 806 and the lower fabric layer 808, along with a portion of the display surface 108 and an adhesive layer 1102.

Proceeding to the lower portion of the scenario 1100, the display surface 108 is attached to the top surface 502 of the mounting wedge 500 via the adhesive layer 1102. According to at least some implementations, an outer edge 1104 of the display surface 108 contacts the inner fabric edge 812 of the upper fabric layer 806. Thus, a smooth transition is obtained between the upper fabric layer 806 and the display surface 108.

While attachment of the display surface 108 to the mounting wedge 500 is shown, it is to be appreciated that that the display surface 108 may be attached to a mounting wedge structure that includes multiple mounting wedges. For instance, with reference to the mounting wedge structure 300 illustrated in FIG. 3, perimeter edges of the display surface 108 can be attached to the mounting wedges 302a-302d of the mounting wedge structure 300.

While implementations are discussed herein with reference to attachment of a display surface to a mounting wedge, it is to be appreciated that a wide variety of other components may be attached and/or mounted to a mounting wedge. For instance, a hinge may be attached to a surface (e.g., a top surface) of the mounting wedge to enable moveable component attachment to a device. A hinge, for example, may be used to attach a moveable cover, a movable support component, a movable display, and so forth, to a mounting wedge. In yet another example, electronic components may be attached to a surface of a mounting wedge, such as a printed circuit (PC) board that includes electrical components of a device, an antenna, a connection port, an audio output device, and so forth.

In yet a further example, components may be embedded within a mounting wedge. For instance, an antenna and/or other component may be embedded within the structure of a mounting wedge, such as to conserve space on a device.

Figure 12:
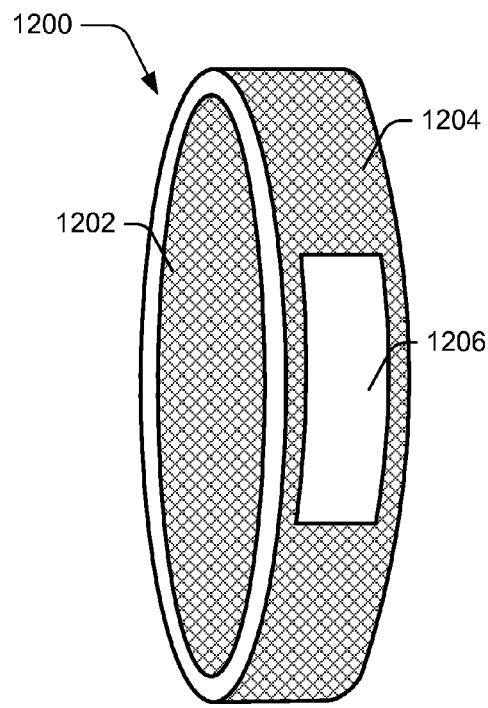
FIG. 12 illustrates a wearable device that utilizes a mounting wedge in accordance with one or more implementations.

FIG. 12 illustrates a wearable device 1200 that utilizes a mounting wedge and/or mounting wedge structure in accordance with one or more implementations. In at least some implementations, the wearable device 1200 represents a "smart watch" and/or other device that may be worn around a user's wrist. The wearable device 1200 includes various electronic components, such as for data processing, wireless data communication, and so forth. Example components of the wearable device 1200 are discussed below with reference to the system 1500 of FIG. 15.

The wearable device 1200 includes an inner fabric layer 1202 which is laminated to an inner surface of the wearable device 1200, and an outer fabric layer 1204 that is laminated to an outer surface of the wearable device 1200. The inner fabric layer 1202 and the outer fabric layer 1204 may be laminated using any suitable technique for fabric attachment. The wearable device 1200 further includes a display surface 1206, which is representative of a visual output surface (e.g., display screen) for the wearable device 1200. In at least some implementations, the display surface 1206 may be touch and/or gesture enabled such that a user can provide input to the wearable device 1200 via touch gestures to the display surface 1206, touchless gestures made in proximity to the display surface 1206, and so forth.

The wearable device 1200 utilizes a mounting wedge structure to attach the display surface 1206 to the wearable device 1200, and to secure the outer fabric layer 1204 to the outer surface of the wearable device 1200 around the edges of the display surface 1206. For instance, a mounting wedge structure may be mounted within the chassis of the wearable device 1200, such as using techniques discussed above. Thus, a mounting wedge structure provides a compact and durable way of securing edges of the outer fabric layer 1204, and attaching the display surface 1206.

Figure 13:
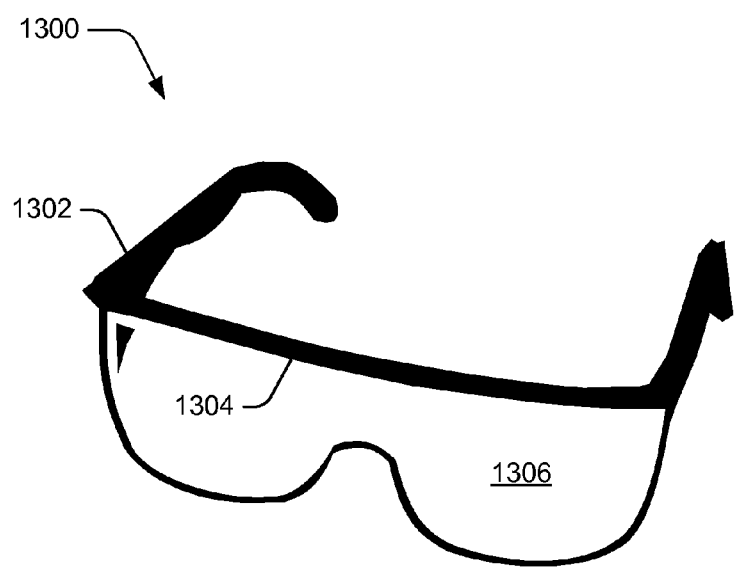
FIG. 13 illustrates a wearable device that utilizes a mounting wedge in accordance with one or more implementations.

FIG. 13 illustrates a wearable device 1300 that utilizes a mounting wedge and/or mounting wedge structure in accordance with one or more implementations. In at least some implementations, the wearable device 1300 represents "smart glasses" and/or other device that may be worn on a user's head. The wearable device 1300 includes various electronic components, such as for data processing, wireless data communication, and so forth. Example components of the wearable device 1300 are discussed below with reference to the system 1500 of FIG. 15.

The wearable device 1300 includes a fabric layer 1302 which is laminated to portions of the wearable device 1300, such as one or more exterior surfaces of the wearable device 1300. With reference to a smart glass example, the fabric layer 1302 is mounted to portions of the glasses frame, such as the temples, the end pieces, the rims/eye wires and/or other lens attachment surface, the bridge, and so forth. For example, a mounting wedge can be attached to a lens attachment portion 1304 of the wearable device 1300. The mounting wedge can provide a way of securing an edge of the fabric layer 1302 and for attachment of lenses 1306 to the wearable device 1300. According to various implementations, utilizing the fabric layer 1302 can increase user comfort when wearing the wearable device 1300, and may decrease slippage of the wearable device 1300 when being worn.

Thus, implementations may utilize a mounting wedge for securing fabric to various portions of an apparatus, and for attachment of various components to the apparatus. In at least some implementations, a mounting wedge decreases fabric slippage and/or delamination. A mounting wedge also provides a large and stable surface area for component attachment.

In at least some implementations, the scenarios discussed with reference to FIGS. 8 and 11 represent a sequential fabrication process that may be performed to produce different instances and implementations of an apparatus according to techniques for mounting wedge for flexible material.

Having discussed some example implementation scenarios for mounting wedge for flexible material, consider now an example procedure in accordance with one or more implementations.

Example Procedure

The following discussion describes an example fabrication procedure utilizing a mounting wedge in accordance with one or more implementations. The example procedure may be employed in the system 1500 of FIG. 15, and/or any other suitable environment. In at least some implementations, the procedure may be partially or wholly performed via automated processes, e.g., fabrication and/or manufacturing processes. The procedure, for instance, describes an example method for performing various aspects of the scenarios discussed above.

Figure 14:
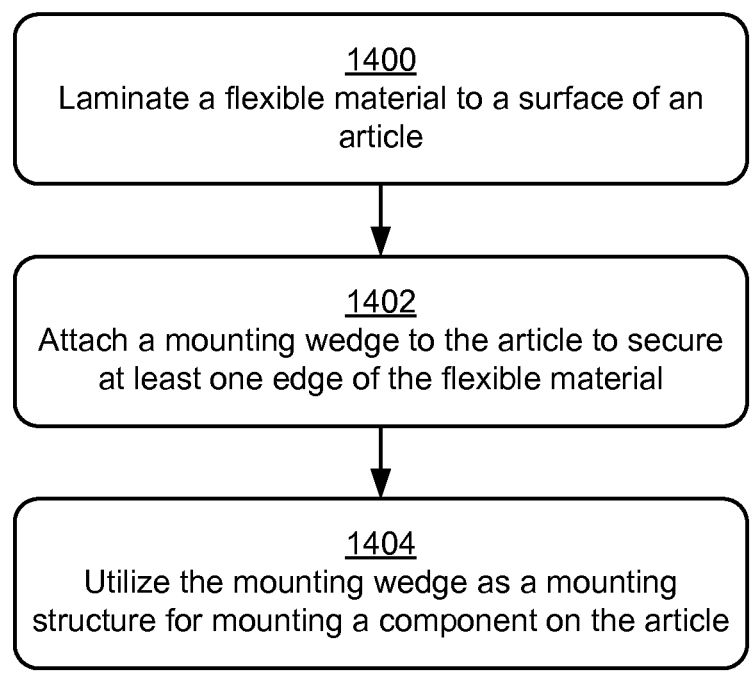
FIG. 14 is a flow diagram that describes steps in a method for article fabrication utilizing a mounting wedge in accordance with one or more implementations.

FIG. 14 is a flow diagram that describes steps in a method in accordance with one or more implementations. The method generally describes an example implementation for article fabrication utilizing a mounting wedge.

Step 1400 laminates a flexible material to a surface of an article. An article, for instance, includes a device such as the computing device 100. However, any suitable article may be laminated with a flexible material. Examples of a flexible material include fabrics and other types of materials, examples of which are discussed above.

Step 1402 attaches a mounting wedge to the article to secure at least one edge of the flexible material. Example ways of attaching a mounting wedge are discussed above. In at least some implementations, installation of a mounting wedge may be part of an installation of a mounting wedge structure that includes multiple mounting wedges.

Step 1404 utilizes the mounting wedge as a mounting structure for mounting a component on the article. The mounting wedge, for instance, may be utilized as a mounting surface for mounting a component, such as the display surface 108 discussed above. Alternatively or additionally, a component may be embedded within the mounting wedge, such as an antenna or other electrical component.

Thus, a mounting wedge may be utilized to secure portions of a flexible material to an article, as well as for component attachment to the article.

Having discussed an example procedure for mounting wedge for flexible material, consider now an example system and device in accordance with one or more implementations.

Example System and Device

Figure 15:
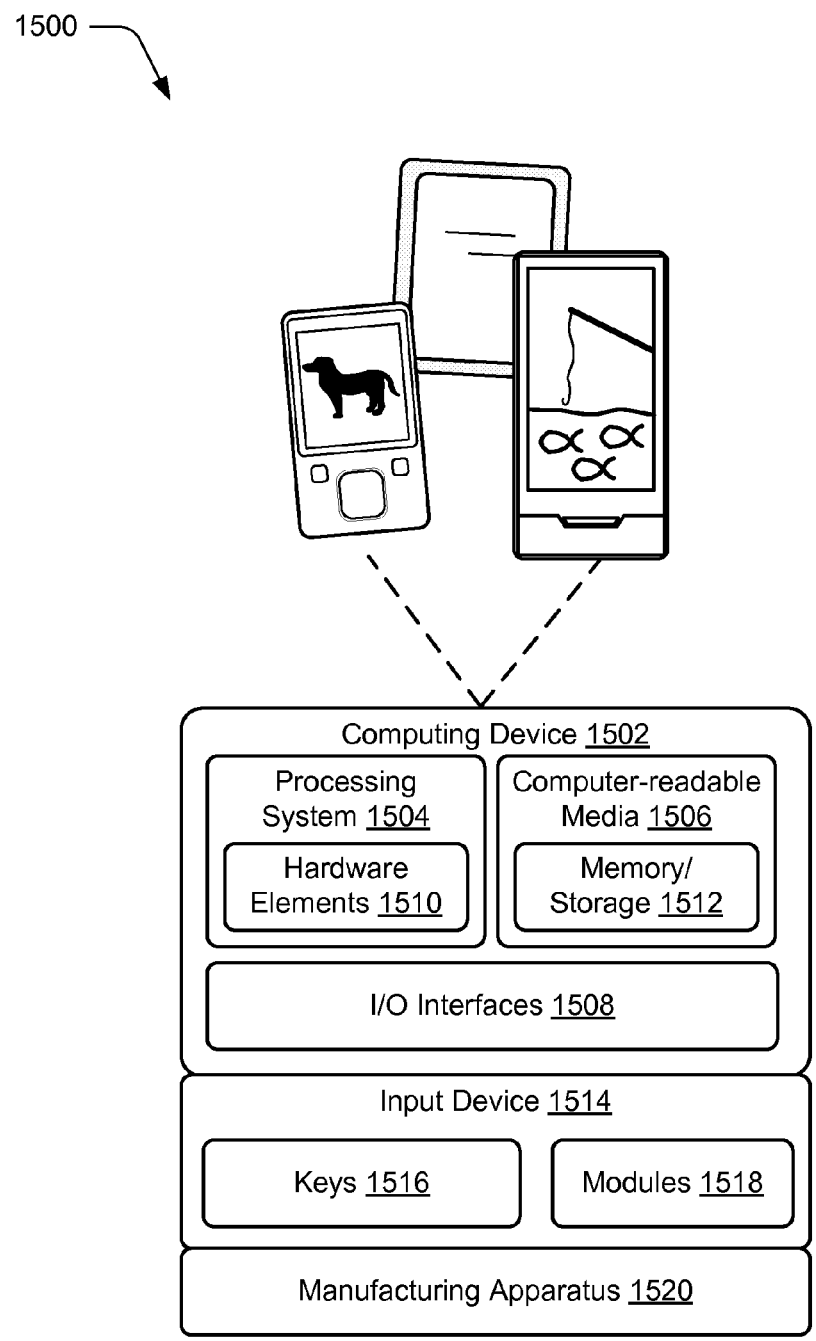
FIG. 15 illustrates an example system and device that can be employed to implement embodiments of the techniques described herein in accordance with one or more implementations.

FIG. 15 illustrates an example system generally at 1500 that includes an example computing device 1502 that is representative of one or more computing systems and/or devices that may implement the various techniques described herein.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware elements 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways to support user interaction.

The computing device 1502 is further illustrated as being communicatively and physically coupled to an input device 1514 that is physically and communicatively removable from the computing device 1502. In this way, a variety of different input devices may be coupled to the computing device 1502 having a wide variety of configurations to support a wide variety of functionality. In this example, the input device 1514 includes one or more keys 1516, which may be configured as pressure sensitive keys, mechanically switched keys, and so forth.

The input device 1514 is further illustrated as include one or more modules 1518 that may be configured to support a variety of functionality. The one or more modules 1518, for instance, may be configured to process analog and/or digital signals received from the keys 1516 to determine whether a keystroke was intended, determine whether an input is indicative of resting pressure, support authentication of the input device 1514 for operation with the computing device 1502, and so on.

The system 1500 further includes manufacturing apparatus 1520, which is representative of various types and/or combinations of manufacturing tools, machinery, control circuits, and so on, for implementing the manufacturing techniques discussed herein. Examples of the manufacturing apparatus 1520 include a stamping press, CNC mills and/or control units, cutting apparatus and/or tools, etching apparatus, casting apparatus, and so forth. In at least some implementations, the manufacturing apparatus can be controlled via portions of the computing device 1502 to implement the example procedures discussed above.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein may generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

Example Claim Implementations

Example implementations include a system that includes a means for securing an edge of a flexible material against an inner edge of a surface of a chassis to which the flexible material is at least partially laminated, and a means for attaching a component adjacent to the inner edge of the surface of the chassis.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
   a chassis;
   a flexible material laminated to at least a portion of a surface of the chassis;
   a mounting wedge attached to the chassis adjacent to the portion of the surface and positioned such that an edge of the mounting wedge pinches an edge of the flexible material against an edge of the portion of the surface of the chassis;
   an adhesive layer at least partially attached to a top surface of the mounting wedge; and
   a display surface that is mounted on the adhesive layer, the outer edge of the display surface contacting the inner edge of the flexible material.

2. An apparatus as recited in claim 1, wherein the flexible material comprises a fabric.

3. An apparatus as recited in claim 1, wherein the chassis includes a wedge channel formed along the edge of the portion of the surface of the chassis, and wherein the mounting wedge includes a wedge rib that interlocks with the wedge channel.

4. An apparatus as recited in claim 3, wherein the wedge rib is disposed on a bottom surface of the mounting wedge.

5. An apparatus as recited in claim 1, wherein the mounting wedge includes a mounting pin that is used to attach the mounting wedge to the chassis.

6. An apparatus as recited in claim 1, wherein the mounting wedge is part of a mounting wedge structure that includes at least one other mounting wedge attached to the chassis, the at least one other mounting wedge being positioned on the chassis such that the at least one other mounting wedge pinches a different edge of the flexible material against a different edge of the portion of the surface of the chassis.

7. An apparatus as recited in claim 1, wherein the apparatus comprises a wearable computing device.

8. A computing device comprising:
a chassis with a surface at least partially laminated with a flexible material;
a mounting wedge attached to the chassis adjacent to the surface such that an edge of the mounting wedge pinches an edge of the flexible material against an inner edge of the surface of the chassis; and
a display surface mounted to a top surface of the mounting wedge via an adhesive layer, the outer edge of the display surface contacting the inner edge of the flexible material.

9. A computing device as recited in claim 8, wherein the computing device comprises a wearable device, the surface comprises an outer surface of the wearable device, and the display surface comprises an output portion of the wearable device.

10. A computing device as recited in claim 8, wherein the chassis includes a wedge channel disposed along the edge of the surface of the chassis, and wherein the mounting wedge includes a wedge rib that interlocks with the wedge channel.

11. A computing device as recited in claim 10, wherein the wedge rib is disposed on a bottom surface of the mounting wedge.

12. A computing device as recited in claim 8, wherein the mounting wedge includes a mounting pin disposed along a bottom surface of the mounting wedge, the mounting pin used to attach the mounting wedge to the chassis.

13. A computing device as recited in claim 8, wherein the mounting wedge is part of a mounting wedge structure that includes at least one other mounting wedge, the mounting wedge structure being used to secure the flexible material against the inner edge of the chassis and as a mounting structure for the display surface.

14. A portable computing device comprising:
a chassis;
a bezel that represents a perimeter portion of a front surface of the chassis and that is laminated with a flexible material;
a mounting wedge attached to the chassis adjacent to the bezel such that an edge of the flexible material is disposed between an edge of the mounting wedge and an inner edge of the bezel; and
a display surface mounted to a top surface of the mounting wedge and surrounded by the bezel.

15. A portable computing device as recited in claim 14, wherein the flexible material comprises a fabric.

16. A portable computing device as recited in claim 14, wherein the chassis includes a mounting channel formed adjacent to the inner edge of the bezel, and wherein the mounting wedge includes a mounting rib that interlocks with the mounting channel.

17. A portable computing device as recited in claim 14, wherein the edge of the mounting wedge pinches the edge of the flexible material against the inner edge of the bezel.

18. A portable computing device as recited in claim 14, wherein the mounting wedge is part of a mounting wedge structure that includes at least one other mounting wedge, the mounting wedge structure being used to secure the flexible material against the inner edge of the bezel and as a mounting structure for the display surface.

19. A portable computing device as recited in claim 14, wherein the mounting wedge includes a mounting pin disposed along a bottom surface of the mounting wedge, the mounting pin used to attach the mounting wedge to the chassis.

20. A portable computing device as recited in claim 14, wherein the mounting wedge is part of a mounting wedge structure that includes at least one other mounting wedge attached to the chassis, the at least one other mounting wedge being positioned on the chassis such that the at least one other mounting wedge pinches a different edge of the flexible material against a different edge of the portion of the surface of the chassis.

* * * * *